US010666608B2

(12) United States Patent
Townsend et al.

(10) Patent No.: US 10,666,608 B2
(45) Date of Patent: *May 26, 2020

(54) TRANSPARENT PROXY AUTHENTICATION VIA DNS PROCESSING

(71) Applicant: Cisco Technology, Inc., San Jose, CA (US)

(72) Inventors: Geoff Townsend, Pleasanton, CA (US); Michael Ellery, Moraga, CA (US); Lucas Siba, Langley (CA); Brian Somers, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/286,128

(22) Filed: Feb. 26, 2019

(65) Prior Publication Data

US 2019/0199678 A1 Jun. 27, 2019

Related U.S. Application Data

(63) Continuation of application No. 14/196,973, filed on Mar. 4, 2014, now Pat. No. 10,277,554.

(51) Int. Cl.
*H04L 29/12* (2006.01)
*H04L 29/06* (2006.01)
*H04L 29/08* (2006.01)

(52) U.S. Cl.
CPC .......... *H04L 61/20* (2013.01); *H04L 61/1511* (2013.01); *H04L 63/0884* (2013.01); *H04L 67/2804* (2013.01); *H04L 67/327* (2013.01)

(58) Field of Classification Search
CPC . H04L 61/20; H04L 61/1511; H04L 63/0884; H04L 67/2804; H04L 67/327
See application file for complete search history.

(56) References Cited

U.S. PATENT DOCUMENTS 6,167,449 A 12/2000 Arnold et al.
6,907,525 B2 6/2005 Pazi et al.
(Continued)

FOREIGN PATENT DOCUMENTS

WO WO2001/041401 A2 6/2001

OTHER PUBLICATIONS

European Examination Report in corresponding European Application No. 15709810.4, dated Mar. 20, 2019, 5 pages.
(Continued)

*Primary Examiner* — Azizul Choudhury

(57) ABSTRACT

A DNS nameserver processes requests for domain name information based on subscriber identifiers, and optionally subscriber information. Based on a subscriber identifier, requests for a target domain name may generate a DNS response with domain name information for a proxy service. Techniques are provided to seamlessly and transparently authenticate a subscriber at the proxy service. The proxy service generates a redirect with a unique domain name including a tracking identifier in response to requests for a target domain name. The nameserver receives a request associated with the unique domain name. The nameserver responds with domain name information of the proxy service and generates a message to the proxy service mapping the tracking identifier to the subscriber identifier. The client then generates a request to the proxy service that includes the tracking identifier. The proxy service uses the mapping from the nameserver to authenticate the corresponding subscriber identifier.

20 Claims, 8 Drawing Sheets

(56) References Cited

U.S. PATENT DOCUMENTS

| | | |
|---|---|---|
| 7,127,524 B1 | 10/2006 | Renda et al. |
| 7,228,359 B1 | 6/2007 | Monteiro |
| 7,313,815 B2 | 12/2007 | Pazi et al. |
| 7,412,515 B2 | 8/2008 | Kupst et al. |
| 7,698,375 B2 | 4/2010 | Hinton et al. |
| 8,224,994 B1 | 7/2012 | Schneider |
| 8,561,161 B2 | 10/2013 | Blakley et al. |
| 8,677,451 B1 | 3/2014 | Bhimaraju et al. |
| 8,949,312 B2 | 2/2015 | McLoughlin et al. |
| 2005/0044352 A1 | 2/2005 | Pazi et al. |
| 2005/0097179 A1 | 5/2005 | Orme |
| 2005/0105513 A1 | 5/2005 | Sullivan et al. |
| 2006/0002308 A1 | 1/2006 | Na et al. |
| 2006/0023744 A1 | 2/2006 | Chen et al. |
| 2006/0031921 A1 | 2/2006 | Danforth et al. |
| 2006/0242301 A1 | 10/2006 | Horton et al. |
| 2006/0242321 A1 | 10/2006 | Hegde et al. |
| 2006/0248190 A1 | 11/2006 | Gardos et al. |
| 2007/0239865 A1 | 10/2007 | Tout |
| 2007/0294419 A1 | 12/2007 | Ulevitch |
| 2009/0113074 A1 | 4/2009 | Statia et al. |
| 2009/0157889 A1 | 6/2009 | Treuhaft |
| 2009/0234845 A1* | 9/2009 | DeSantis ............... H04L 43/026 |
| 2010/0082777 A1 | 4/2010 | Montgomery et al. |
| 2010/0257232 A1 | 10/2010 | Joffray et al. |
| 2010/0274970 A1 | 10/2010 | Treuhaft et al. |
| 2010/0322245 A1 | 12/2010 | Valko et al. |
| 2011/0019547 A1 | 1/2011 | De Lutiis et al. |
| 2011/0289434 A1 | 11/2011 | Kieft |
| 2012/0117649 A1 | 5/2012 | Holloway et al. |
| 2012/0158969 A1 | 6/2012 | Dempsky et al. |
| 2012/0278467 A1 | 11/2012 | Schneider |
| 2013/0117439 A1 | 5/2013 | Oliver et al. |
| 2013/0166520 A1 | 6/2013 | Vass |
| 2013/0254423 A1 | 9/2013 | George, IV |
| 2013/0275570 A1 | 10/2013 | Treuhaft et al. |
| 2014/0074780 A1* | 3/2014 | Goetsch ............... H04L 67/10 707/613 |
| 2015/0012970 A1 | 1/2015 | Toksvig et al. |
| 2015/0256508 A1 | 9/2015 | Townsend et al. |

OTHER PUBLICATIONS

English translation of the First Office Action in counterpart Chinese Application No. 201580011716.4, dated Sep. 13, 2018, 5 pages.
International Search Report & Written Opinion of the International Searching Authority dated May 11, 2015, International Application No. PCT/US2015/018040.
U.S. Appl. No. 14/596,579, filed Jan. 14, 2015.

\* cited by examiner

TRANSPARENT PROXY AUTHENTICATION VIA DNS PROCESSING

CROSS-REFERENCE TO RELATED APPLICATIONS

This application is a continuation of U.S. patent application Ser. No. 14/196,973, filed Mar. 4, 2014, the entirety of which is incorporated herein by reference.

BACKGROUND OF THE INVENTION

Field of the Invention

Embodiments in accordance with the present disclosure relate to computer networks, and particularly to processing domain name system (DNS) information.

Description of the Related Art

Network resources such as those available via the Internet are accessed according to Internet Protocol (IP) addresses. IP addresses are represented numerically, traditionally as a quartet of values having the form 111.111.111.111. From the early inception of network computing, familiar alphanumeric name-based addressing has been used to allow users to more easily locate and remember the addresses for resources. For example, domain names are assigned to computing servers and clients. The domain name system facilitates the translation between IP addresses and domain names by maintaining accessible records that associate one or more domain names with one or more IP addresses.

While early network implementations could utilize a single periodically distributed ASCII file to translate between domain names and IP addresses, modern networks such as the Internet rely on the domain name system (DNS) for the resolution of names and addresses. FIG. 1 is a simplified block diagram illustrating traditional DNS processing. A client computing device 102 includes a resolver 104 for initiating DNS requests. The resolver may be a standalone component such as a software module of the client, or may be embedded within various applications such as web browsers, file transfer protocol programs, email applications, and the like that utilize Internet resources. When the client requests an Internet resource such as a web page or delivery of an email message, the resolver is charged with determining the IP address(es) of the requested resource so that the appropriate request can be issued to the appropriate address. The resolver is traditionally configured with the addresses of a group of ISP DNS Nameservers 110 that handle recursive DNS processing for the client device. As is often the case, the group of nameservers is provided by the Internet Service Provider (ISP) for the client device, although this isn't required. Nameservers 110 are recursive nameservers which resolve DNS requests using a recursive process that accesses various other nameservers in order to satisfy a given query.

Consider an example DNS request 150 from client 102 to nameserver 112 for the domain name information of "www.opendns.com". The ISP DNS nameserver first checks a local cache to attempt to resolve the request. The ISP DNS nameserver maintains the local cache with domain name records that have already been resolved to improve performance in responding to subsequent DNS requests. If nameserver 112 is maintaining the requested domain name in the local cache, it will issue a DNS response 152 to the client with the domain name record including the IP address of "www.opendns.com".

If the ISP DNS nameserver 112 does not have an entry for the requested domain name, it will launch recursive processing using authoritative DNS nameservers 120 and/or root DNS nameservers 130. An authoritative nameserver maintains an authoritative or master list for a zone which is a group of computing devices. Recursive DNS nameservers obtain domain name information such as the IP address of a requested resource from authoritative nameservers. The root DNS nameservers are also authoritative DNS nameservers. They are called root DNS nameservers because they contain the authoritative domain name information for a set of top level domains (TLDs) in the so-called root zone. For example the root DNS nameservers contain the IP addresses for finding domain name information for lower level domains in the top level domains. The top level domains include the generic top-level domains (gTLD) of .com, .org, .net, etc.

Nameserver 112 first issues a DNS request 154 to root DNS nameservers 130. The root DNS nameservers 130 can include multiple nameservers, one or more of which can be issued a request for the needed information. One of the nameservers 132 responds with a DNS response 156 including the IP address of one or more authoritative name servers for the ".com" domain. When ISP DNS nameserver 112 obtains the IP address for the ".com" domain, it issues another DNS request 158 to the specified one of the authoritative DNS nameservers 120. The specified authoritative nameserver will issue a DNS response 160 with the IP address of one or more nameservers for the "opendns.com" domain. This process repeats between the ISP DNS nameserver and the authoritative name servers 120 until the ISP DNS nameserver receives the IP address for "www.opendns.com". The client 102 application can then issue the resource request to the appropriate computer, such as an HTTP request to the server at the corresponding IP address.

FIG. 2 is a simplified block diagram of a typical authoritative DNS nameserver 120 as shown in FIG. 1 that can store domain name records. In this example, the authoritative DNS nameserver 120 is a computer system with a processor 250 coupled to a communications interface 260 and a memory or storage 270 via a system bus 252. The communications interface 160 exchanges data with a communications network, such as the Internet, via line 154. The processor 250 receives DNS requests from the Internet and resolves the DNS requests based on domain name records, such as a DNS record 280 stored in memory 270. The DNS record 280 includes a domain name 282, which is used as a key to lookup a corresponding IP address 284, and includes a time-to-live (TTL) value 286. The TTL value for the DNS record can be set by the administrator of the authoritative DNS nameserver. The TTL value is provided as part of the DNS response to DNS requests and is used by the receiving nameservers to control how long the DNS record should be maintained and treated as valid.

DETAILED DESCRIPTION

Figure 1:
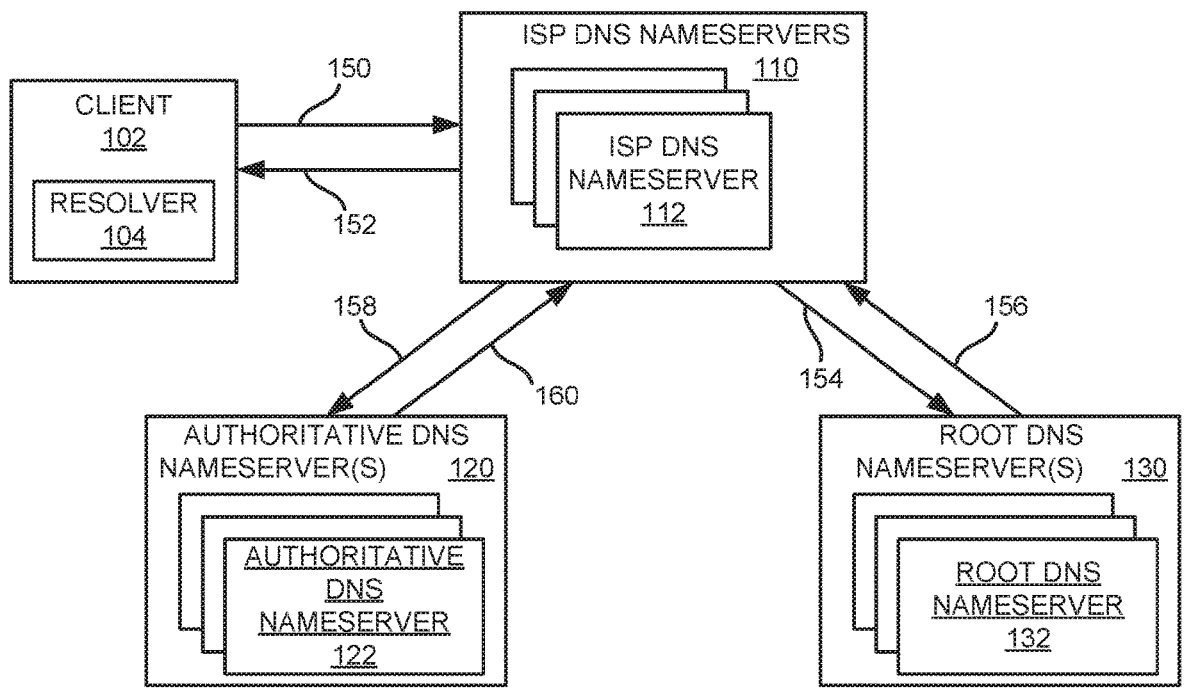
FIG. 1 is a simplified block diagram of a computer network depicting traditional processing of DNS requests.
Figure 2:
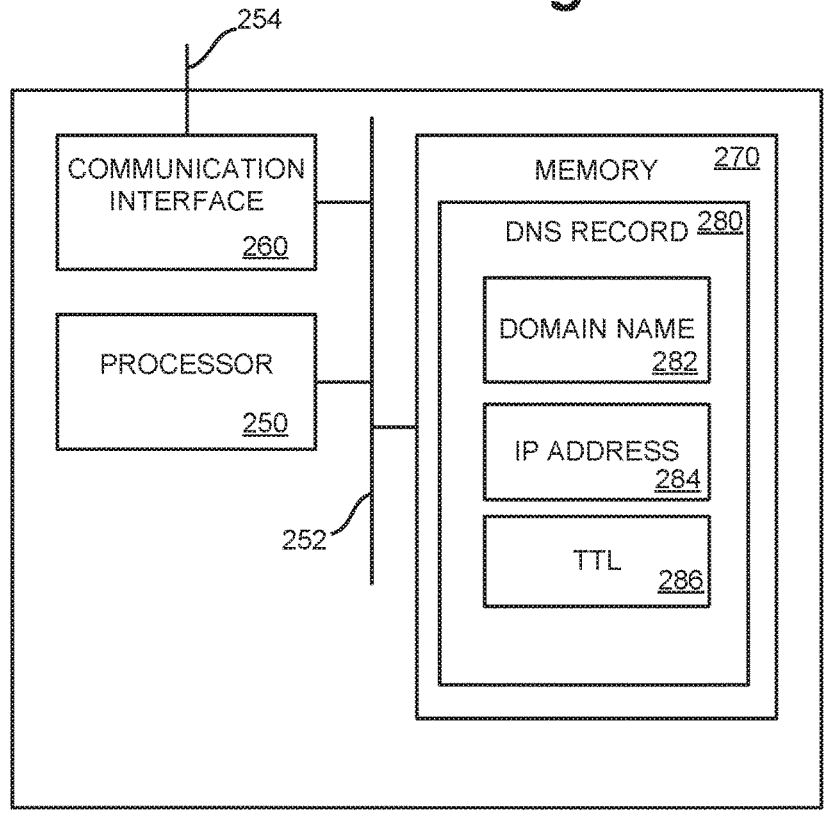
FIG. 2 is a simplified block diagram of an example of an authoritative DNS name server.

Systems and methods for processing domain name system requests in accordance with subscriber information are provided. A request for domain name information from a subscriber can be correlated with subscriber preferences using a subscriber identifier to resolve the domain name information at a domain name system (DNS) nameserver. Access to flagged domain names may be blocked or proxied in accordance with the subscriber preferences for example. In response to a request for a flagged domain name from a client device, the nameserver may provide domain name information for a proxy service. Communication between the proxy service and the DNS nameserver is facilitated to permit the proxy service to determine the subscriber identifier from the DNS nameserver. The subscriber can be authenticated at the proxy service seamlessly without input from the subscriber or client device based on the direct communication from the DNS nameserver.

The proxy service may generate tracking identifiers and unique domain names including the tracking identifiers to trigger the nameserver to transmit subscriber identifiers in one embodiment. For example, the proxy service can determine if a resource request for a target domain name includes a tracking identifier, as can be passed in a cookie for the target domain name. If the resource request does not include a tracking identifier, the proxy service generates a tracking identifier and a unique domain name including the tracking identifier. The proxy service sends a response to the client device that includes a redirect to the unique domain name and a cookie for the target domain name that includes the tracking identifier.

The nameserver receives a DNS request from the client device for the unique domain name. The nameserver correlates the tracking identifier from the unique domain name with the subscriber identifier for the DNS request. The nameserver sends the correlated subscriber identifier and tracking identifier to the proxy service. The nameserver sends domain name information for the proxy service in response to the DNS request.

The proxy service receives a resource request for the unique domain name in response to the issued redirect. The proxy service extracts the target domain name from the unique domain name and redirects the client device to the target domain name. The proxy service then receives a resource request for the target domain name. Significantly, the resource request passes the cookie with the tracking identifier. The proxy service extracts the tracking identifier and determines the corresponding subscriber identifier using the correlated information from the nameserver. The proxy service can then generate a response to the resource request based on the subscriber preferences associated with the subscriber identifier. In an alternate embodiment, the proxy service may extract the tracking identifier and the target domain name from the request for the unique domain name and directly respond to the client device without the described redirect.

Figure 3:
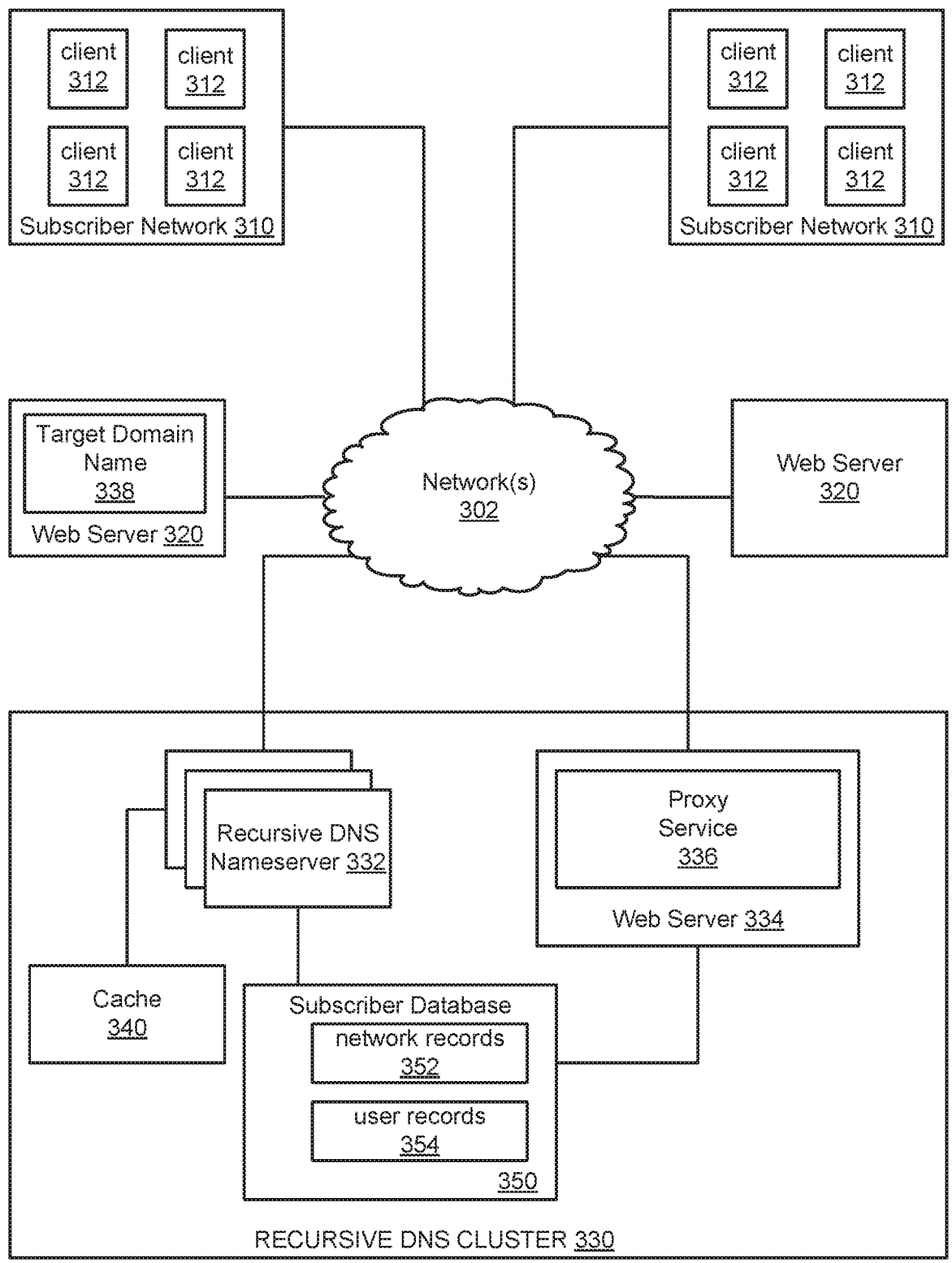
FIG. 3 is a simplified block diagram of a computing system including a recursive DNS nameserver in accordance with one embodiment of the disclosed technology.

FIG. 3 is a block diagram of a system for processing domain name system (DNS) requests in accordance with an embodiment of the present disclosure. Subscriber networks 310, web servers 320 and a recursive DNS cluster 330 are each in communication with one or more network(s) 302. Although two subscriber networks with four client devices each are shown, any number of subscriber networks or client devices may be used.

Network(s) 302 and 310 can include any combination of local area networks, wide area networks (WAN), the Internet, and/or any other network. The recursive DNS clusters can vary by implementation and include any suitable computing system such as a server, group, grid, or distributed platform of computer systems configured to respond to requests for domain name information and/or to process network-related resource requests. While the cluster in FIG. 3 is depicted with multiple recursive DNS nameservers, other embodiments may include a single computing system within a cluster such as a single server. The individual recursive nameservers in a cluster can be formed of hardware and/or software configured as described for domain name resolution and network processing. By way of non-limiting example, the various nameservers can include personal computers, servers, workstations, mainframes, etc.

Each of the recursive DNS nameservers in a cluster resolves requests for domain name information from other computing devices such as client devices 312 operated by individual users on a subscriber network 310. The nameservers 332 in cluster 330 include or are in communication with a local cache 340 and a subscriber database 350. The domain name information stored in the cache can be any type of information associated with a domain name. Some examples of domain name information are resource records, such as "A" records used for storing a 32-bit IP address associated with a domain name, "AAAA" records used for storing an IPv6 128-bit address associated with a domain name, and "CNAME" or canonical name records for a DNS alias. A request for domain name information can include a packet, cell, message, or signal used to ask for domain name information.

The cache 340 at each cluster facilitates more efficient responses to DNS requests by storing domain name information such as DNS records corresponding to previously received DNS requests. The cache may also store other domain name information, such as pre-fetched domain name information. If the cache contains the DNS record(s) needed to respond to a DNS request, the DNS nameserver can return the cached information without contacting other nameservers to fulfill the request.

When DNS requests from clients 312 or other computing devices cannot be fulfilled with cached domain name information, the recursive DNS cluster initiates recursive processing to determine the needed information. For example, a DNS nameserver 332 may first issue a DNS request to one of the root servers for generic top level domain information, followed by one or more DNS requests to various authoritative name servers to determine the requested domain name information.

A response can also include a packet, cell, message, or signal used for transmitting domain name information. A Uniform Resource Identifier (URI) identifies resources available through network hosts. Some examples of URIs include protocols such as http—HTTP resources, https—HTTP over SSL, ftp—File Transfer Protocol, mailto—E-mail address, ldap—Lightweight Directory Access Protocol lookups, file—resources available on the local computer or over a local file sharing network, news—Usenet newsgroups, gopher—the Gopher protocol, telnet—the TELNET protocol, and data—the Data: URL scheme for inserting small pieces of content in place. Typically, a URI such as a URL includes domain names that form a portion of the URL.

In response to a DNS request for domain name information associated with a domain name, a recursive DNS nameserver within a cluster can determine a subscriber identifier. A subscriber is generally an individual and/or entity that agrees to service conditions of an operator of a recursive DNS cluster 330. Subscribers may range from entities operating large networks 310, such as those provided by a wireless service providers or large corporations, to individuals having a home internet connection. It is noted that while subscriber networks 310 are depicted with multiple client devices 312, that is not required. In one example, the subscriber may operate a single personal computer with an internet connection. Embodiments in accordance with the present disclosure may be applied in any type of environment.

A subscriber identifier discriminates the subscriber associated with the request for domain name information. Some examples of a subscriber identifiers are IP addresses, userID's, deviceID's, and secure tokens. If an IP address identifier is used, the recursive DNS nameserver can inspect the network packet containing the request to determine the source IP address of the packet. A username or secure token may be included in the request for domain information from which the recursive DNS nameserver determines the subscriber identifier and the subscriber information. Some subscribers may be associated with multiple users. Accordingly, a subscriber identifier may identify a subscriber and optionally a particular user associated with the subscriber where a subscriber includes multiple users. Reference to a subscriber identifier hereinafter includes an identifier of a subscriber as well as an identifier of a particular user associated with a subscriber.

In one example, a device or application on a subscriber's network is setup to modify DNS requests to include a subscriber identifier. For example, an extension of the DNS protocol can be used such as EDNS which allows more flags, label types and return codes to be defined. EDNS may allow the sender of a DNS message (e.g., client device 312) to advertise its own extended capabilities to the message receiver (e.g., DNS nameserver 332). This may be accomplished through the inclusion of an OPT pseudo-RR in the additional data section of a request or response. The OPT pseudo-RR may include one or more EDNS options. In one example, a client device 312 can supply a device ID to DNS nameserver 332 as a subscriber identifier. For example, a proprietary device ID key/value pair in an OPT resource record (RR) may be provided in the additional section of a DNS query. The RR can appear in the DNS query's additional section, causing DNS nameserver 332 to interpret the last eight octets of the section as a device ID. The device ID can act as an index into a database of subscriber information associated with DNS nameserver 332. Other subscriber identifiers and techniques for determining the same can be used.

The recursive DNS nameserver resolves requests for domain name information based on subscriber information associated with the subscriber identifier to generate a response in one embodiment. The recursive DNS nameserver then returns the response to the client device, providing the resolved domain name information in accordance with the subscriber information. By way of example, the recursive DNS nameserver may obtain the network (e.g., IP) address in the domain name record of a requested domain name for a first subscriber. For a second subscriber, the recursive DNS nameserver instead may obtain a substitute network (e.g., IP) address that satisfies a substitution criterion for the requested domain name based on the subscriber information.

In some embodiments, a subscriber of a service provided by the DNS cluster may set one or more preferences or selections for how the options are to be enabled or otherwise applied when a DNS nameserver 332 resolves DNS queries associated with the subscriber. Preferences or settings for a subscriber may be stored as subscriber information at subscriber database 350 or in one or more storage devices accessible to the DNS cluster 330. Upon identifying a subscriber, subscriber information associated with the subscriber identifier may be used to alter the IP address in a DNS response. For example, a subscriber may establish subscriber information that instructs the DNS nameserver to alter responses to DNS requests that are associated with adult web sites, potential phishing or pharming sites, or other sites deemed inappropriate by the subscriber or to which the subscriber wishes to block or filter access, etc. Web server 334 and nameserver 332 each have access to subscriber database 350. In FIG. 3, the web server and nameserver utilize a single database but individual databases containing the same information may be used in other embodiments.

The subscriber information in database 350 may include network records 352 and/or user records 354 that are used to determine a particular IP address to resolve for a given domain name. The network and user records may each specify one or more DNS resolution options, filters, features or other techniques for determining what IP address to resolve for a given domain name. For example, in providing DNS services to the DNS client, the DNS servers may provide resolved domain name information or redirect the DNS client to another location based on subscriber information stored at the DNS servers that indicates how an end user wants the DNS servers to employ the DNS resolutions options or features. In various examples, the DNS cluster may provide various DNS resolution options or features, such as misspelling redirection, parental filters, domain blocking, or phishing protection through the DNS process.

Network records 352 specify preferences or selections for resolving domain name queries associated with a particular subscriber's network or networks 310. The subscriber may specify resolution preferences that will apply to all traffic originating at their network 310 in one embodiment. DNS nameserver 332 can use a network identifier, such as an IP address from which the DNS query was issued, to determine a corresponding network record 352. A subscriber may set permissions and preferences in network records to indicate that certain preferences can be bypassed by particular users of the subscriber's network. For example, an administrator for a corporate network 310 may set up network records 352 to allow certain users of network 310 to bypass particular preferences in the network records, such as those blocking access to certain domains. Alternatively or additionally, permissions and preferences for overriding network preferences may be included in user records 354.

User records 354 include subscriber information for individual users or entities using the services of DNS cluster

330. For example, a corporate subscriber may establish user records for multiple individuals within the organization to specify resolution preferences or selections that will apply to DNS requests issued by the user. DNS nameserver 332 can use a subscriber identifier such as a userid, token or other identifier to determine a corresponding network record 352 and/or user record 354 for a particular request.

User records and network records may be used together to determine a set of permissions or preferences for applying to any individual request for domain name information, or requests for actual resources as will be explained hereinafter. However, it is noted that implementations need not include network records and user records and may simply include subscriber records.

The domain name records in cache 340 may be associated with or store one or more flags. A flag can be any indicator, marking, or symbol associated with a domain name. For example a binary indicator stored in the domain name record can be used. A flag may be used to identify various types of information for a particular domain. For example, a flag may be used to mark a domain name as suspicious or untrustworthy, such as a site engaged in pharming or phishing activities. A flag may also indicate that a domain hosts illegal material, hate speech, pornography, material related to drugs or alcohol, or otherwise objectionable material that a subscriber does not wish to access or permit access to. Any number of flags can be used to create any number of categorizations for domain names. For example, flags denoting various levels of adult material may be used to classify domain names according to their age-appropriateness. Flags can also be set in domain name records to cause requests for a particular domain names to be proxied. This can allow a subscriber to have traffic for certain domain names proxied, for example for logging, auditing and the like, while traffic for other domains is not proxied. Category information and/or flags can be maintained in other manners. For example, flags or category information can be provided in a general database or in the subscriber database.

When a request for domain name information is received, the DNS nameserver 332 resolves the domain name query using the subscriber information and any flags in the domain name record. For example, a network record for a DNS request may set a preference that a particular category of domains or a particular domain is to be blocked from access by devices on the network. If a DNS request is for a domain having a flag matching such a preference in the network record, the DNS nameserver may generate a DNS response with a substitute IP address that directs the client device to an alternate domain. In one example, the DNS nameserver provides the client device with domain name information associated with proxy service 336 on web server 334. In response to the client device's resource request, the proxy service can provide a block or landing page to the client device, for example, informing the subscriber that the requested domain is not accessible on their network. The block or landing page refers generally to any resource or information provided by the proxy service in response to a request for a target domain that is not an actual resource provided by the target domain. The proxy service may authenticate a subscriber and/or user associated with the subscriber before providing the landing page. For example, the landing page may be tailored based on the subscriber information. Furthermore, the proxy service may authenticate the subscriber and proxy resource requests from the subscriber for the target domain name.

The proxy service 336 transparently authenticates subscribers based on a subscriber identifier received from the DNS nameserver. In one example, the proxy service 336 seamlessly authenticates a subscriber using a series of redirects to create a mapping between a subscriber identifier received by the DNS nameserver to an authentication cookie for a target domain name. When the proxy service receives a request for a target domain and cannot identify a subscriber identifier associated with the request, it can issue a redirect to the client device that triggers the DNS nameserver to transmit the subscriber identifier to the proxy service in response to a corresponding DNS request. The series of redirects utilizes a tracking identifier and unique domain name to enable the proxy service to map the subscriber identifier to a particular resource request for the target domain name. In this manner, the DNS nameserver transmits the subscriber identifier from the DNS nameserver to the proxy service without requiring input from the subscriber or a user associated with the subscriber.

In one example, proxy service 336 receives a resource request associated with a target domain name 338 and examines the request for an authentication cookie for the target domain name. If the request does not include an authentication cookie, the proxy service generates a tracking identifier and a unique domain name for the request. The unique domain name includes the tracking identifier. The proxy service generates a redirect response including the unique domain name. The response includes a cookie for the target domain name that includes the tracking identifier.

The client 312 issues a DNS request to DNS nameserver 332 for domain name information for the unique domain name. The client 312 passes the subscriber identifier with the DNS request, for example as an EDNS header. The DNS nameserver recognizes the unique domain name and in response as corresponding to a proxy service authentication process and extracts the tracking identifier from the unique domain name. The DNS nameserver generates a message to the proxy service that correlates the tracking identifier with the subscriber identifier. The DNS nameserver returns domain name information for the proxy service to the client 312 in response to the DNS request.

The client 312 issues a resource request for the unique domain name to the proxy service. The proxy service extracts the target domain name from the unique domain name. The proxy service issues a redirect response to the client for the target domain name. The client 312 issues a resource request for the target domain name to the proxy service. The client 312 passes the authentication cookie generated for the target domain name by the proxy service to the proxy service with the request. The proxy service extracts the tracking identifier from the authentication cookie.

The proxy service 336 attempts to determine a subscriber identifier corresponding to the tracking identifier based on any messages it has received from the DNS nameserver. If the proxy service finds a message with a correlation between the tracking identifier and a subscriber identifier, it authenticates the subscriber identifier. The proxy service proxies the request for the target domain name in one example. The proxy service can issues one or more requests to the target domain 338 and return one or more resources to the client 312 using resource(s) received from the target domain 338. In one example, the proxy service accesses subscriber information from database 350 corresponding to the subscriber identifier. The proxy service can apply the subscriber preferences to generate a reply to the resource request from the client 312. For example, the subscriber information may indicate that the subscriber or user associated with the subscriber can or cannot access the target domain name. If the subscriber information indicates that the subscriber cannot access the target domain name, the proxy service may issue a redirect to the client 312 for a landing or block page for example. As earlier described, the proxy service may return a landing or block page without using the subscriber information in one embodiment.

Figure 4:
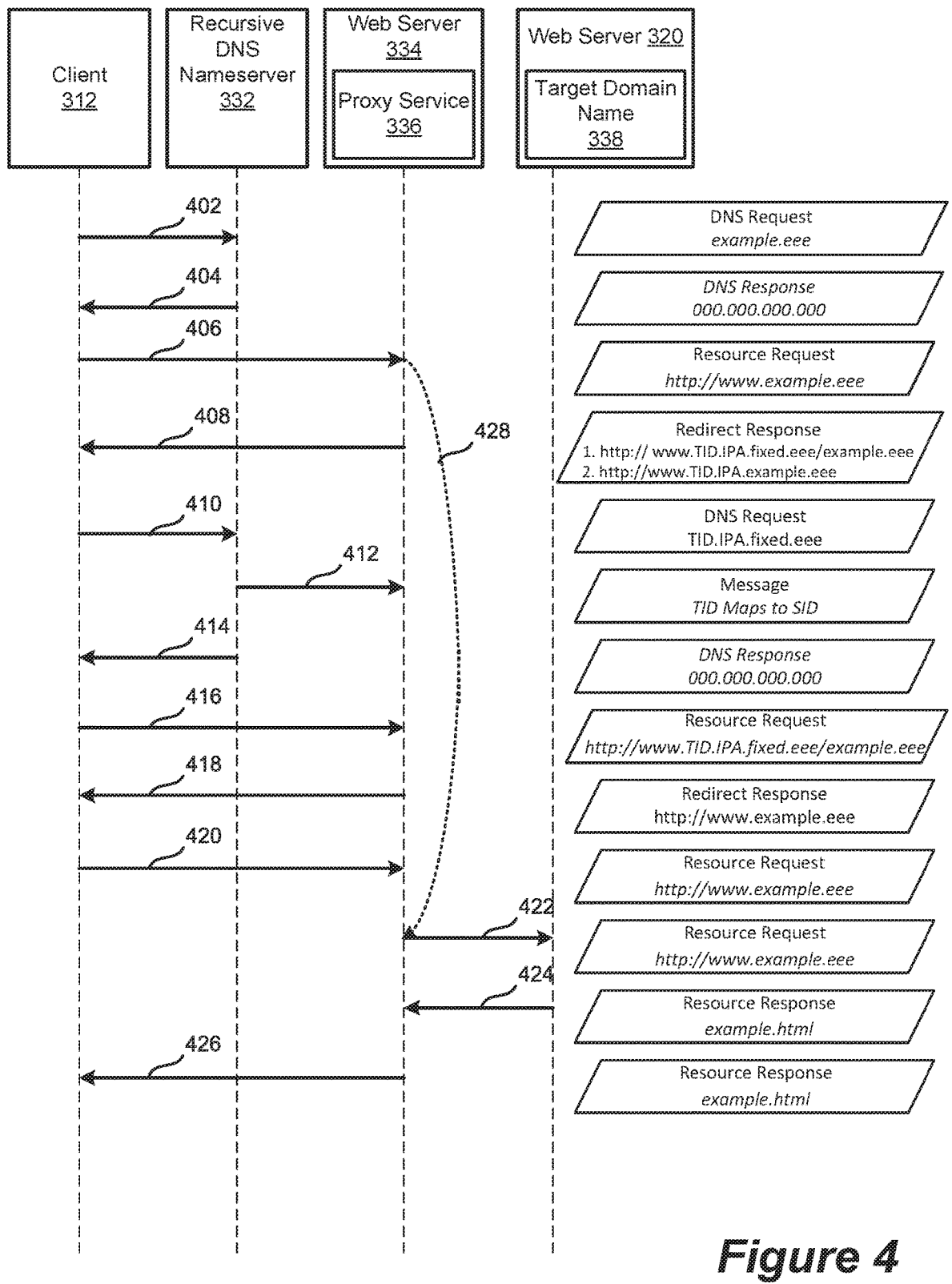
FIG. 4 is a timing diagram depicting traffic between various components of FIG. 3 when processing a DNS request and resource request for a target domain in one embodiment.

FIG. 4 is a diagram depicting traffic between a client device 312, a recursive DNS Nameserver 332, a proxy service 336, and a web server 320 associated with a target domain name 338 in one example. The process begins when a subscriber or user associated with a subscriber (hereinafter just subscriber), issues a domain name system (DNS) request 402 to a recursive DNS name server 332. A specific example is provided where request 402 is issued for the domain name information of a target domain name "example.eee." It is noted that any examples used herein are intended to be fictitious and are provided only to better illustrate the disclosed technology with respect to specific examples.

In response to request 402, name server 332 obtains domain name information for the target domain name. The name server may acquire a domain name record for the target domain name from cache 340 in one example. If a domain name record is not available for the requested domain name, the name server may recursively resolve the domain name information by issuing a request to one or more root, authoritative and/or other recursive domain name servers.

The nameserver also determines a subscriber ID associated with the DNS request. In one example, the nameserver determines a userid or token passed with the DNS request as earlier described. Using the subscriber ID, the nameserver obtains subscriber information, such as a network record and/or user record from database 350, for a particular subscriber associated with the DNS request. The user and network records can be used to determine if the subscriber is permitted access to the target domain name when on the subscriber network 310.

The target domain name may be associated with one or more flags corresponding to one or more preferences of the subscriber indicating that the domain name information should not be provided. For example, the network record associated with the IP address may indicate that no subscribers from that network may access the requested domain. Additionally or alternatively, the user record may indicate that the subscriber does not wish to be provided with domain name information associated with that particular domain.

Based on any flags and subscriber preferences, nameserver 332 issues a DNS response 404 to the client device 312. In this example, it is assumed that the subscriber information indicates that the subscriber or user associated with the subscriber should not access the target domain name and therefore that the domain name information should not be provided. Accordingly, nameserver 332 does not provide the domain name information (e.g., "002.000.000.000") for the requested domain name, but instead provides a DNS response 404 with domain name information (e.g., "00.000.000.000") for proxy service 336 at web server 334.

Proxy service 336 receives a resource request 406 (e.g., HTTP) from client 312 that is associated with the target domain name. For example, the request may include a URI including the target domain name 228. In FIG. 4, the proxy service receives a request with the URI "http://www.example.eee." The client device 312 issues the request to the proxy service based on the domain name information provided by nameserver 332.

Proxy service 336 examines the request to determine if it includes an authentication cookie for the target domain name. For example, proxy service 336 may receive an authentication cookie or other predetermined identifier for the target domain including a tracking identifier used in identifying a subscriber ID corresponding to the request. If the proxy service 336 does not receive an authentication cookie for the target domain, it issues a redirect response 408 to the client device 312.

The redirect response 408 is generated to initiate a process for identifying and authenticating the subscriber corresponding to request 406 at the proxy service 336. Proxy service 336 generates a unique domain name to track request 406. In one example, the unique domain name includes a unique tracking identifier generated by the proxy service 336 for the request 406. Proxy service 336 also generates an authentication cookie for the target domain name. The proxy service includes the tracking identifier in the authentication cookie. The proxy service then issues a redirect response 408 that is associated with the unique domain name. Additionally, the response 408 sets the authentication cookie for the target domain name, including the tracking identifier.

FIG. 4 illustrates two examples of redirect URI's that include the unique domain name. In the first example, the unique domain name includes a fixed domain name portion and one or more dynamically generated portions to generate the unique domain name. In this example, the fixed domain name portion is "fixed.eee." The dynamically generated portions include the tracking identifier "TID" for the request and an identifier "IP" of the proxy service. The tracking identifier TID and identifier are appended to the fixed domain name as subdomain names in this example. Additionally, the unique domain name includes the target domain as an appended argument. For example, a trimmed version of the URI received with request 406 is appended as an argument in FIG. 4. The trimmed version is the original URI with the protocol "http" and domain name label "www" removed. The identifier "IP" of the proxy service is an IP address of the web server 334 hosting the proxy service. The identifier may be included in embodiments where the proxy service may reside on multiple machines so that the nameserver can properly generate a later message to the proxy service. The identifier of the proxy service is optional and may not be used in some implementations.

In the second example, the unique domain name is based on the target domain name rather than a fixed domain name. For example, the tracking identifier can be added as a subdomain of the target domain name to generate the unique domain name. Additionally, the identifier of the proxy can be appended as a subdomain of the target domain name. Other techniques of generating unique domain names that include a tracking identifier can be used.

The client 312 receives the redirect response 408 from proxy service 336 including a redirect URI associated with the unique domain name. The client 312 issues a DNS request 410 to the DNS nameserver 332 requesting domain name information for the unique domain name. The remainder of FIG. 4 continues with the first example of a unique domain name.

The DNS nameserver receives DNS request 410 and identifies the unique domain name as corresponding to an authentication transaction initiated by proxy service 336. DNS nameserver 332 may be configured to initiate a subscriber identification and correlation process based on the unique domain name. For instance, the DNS nameserver may be configured to initiate the process based on a predetermined fixed domain being in a DNS request. The DNS nameserver may be configured to initiate the process based on a predetermined format of the domain name request. For example, the DNS nameserver may initiate the process in response to requests for domain names having a format of "TID.IP.target_domain_name.com."

Nameserver 332 determines the subscriber identifier associated with DNS request 410. Determining the subscriber identifier may be performed as described with respect to DNS query 402. Nameserver 332 also determines the tracking identifier associated with DNS request 410. For example, nameserver 332 can extract the tracking identifier from the subdomain of the target domain name or the fixed domain name in various implementations.

Nameserver 332 sends a message 412 to the proxy service 336 in response to DNS request 410. Message 412 includes a correlation or mapping of the tracking identifier from the unique domain name to the subscriber identifier included in the DNS request. In one example, message 412 is a unicast message having a payload that includes the subscriber identifier and tracking identifier. In another example, the payload may include the subscriber information such as policy and preference information from database 350. Although not shown, the proxy service 336 may issue a unicast message to the nameserver 332 to acknowledge receipt of message 412 in one example.

Nameserver 332 issues a DNS response 414 to the client device 312 including domain name information in response to the request 410 associated with the unique domain name. Nameserver 332 returns domain name information for the proxy service 336 causing the client device to return to the proxy service in response to the unique domain name. In one embodiment, the nameserver 332 may wait until it receives a message from the proxy service confirming receipt of the tracking identifier to subscriber identifier mapping. In another embodiment, the nameserver 332 can issue the DNS response without waiting for a reply from the proxy service. In one embodiment, the domain name information returned in response 414 is based on the IP address of the proxy service that was included in the unique domain name. For instance, nameserver may use the identification from the DNS request to return domain name information for the particular web server 334 from which the redirect originated and to which the DNS nameserver sent the tracking identifier to subscriber identifier mapping.

After receiving DNS reply 414, client 312 issues a resource request 416 to proxy service 336. The resource request includes the redirect URI "http://www.TID.IPA-.fixed.eee/example.eee" provided by proxy service 336 for the unique domain name in response 408. Proxy service 336 identifies the unique domain name submitted by the client 312 and extracts the target domain name "example.eee" from the unique domain name. Proxy service 336 issues a redirect response 418 to the client device 312 with a URI "including the target domain name.

Client 312 issues a resource request 420 to the proxy service with the URI from redirect 418. Client 312 typically will have the domain name information for the target domain from reply 404 so an additional DNS request is not issued. However, client 312 may issue another request to DNS nameserver 332 and again receive a response with domain name information mapping to proxy service 336. Client 312 passes the authentication cookie for the target domain to the proxy service 336 with the request 420. Recall that proxy service passed the authentication cookie to the client device 312 in response 408, setting the cookie for the target domain name.

Proxy service 336 authenticates the subscriber in response to request 420 in one embodiment. Authenticating the subscriber only may include determining a subscriber identifier for request 420 using the authentication cookie in one embodiment. Proxy service 336 extracts the tracking identifier placed into the cookie, accesses the information received from DNS nameserver 332 in message 412, and determines the subscriber identifier corresponding to request 420 using the tracking identifier to subscriber identifier mapping.

In one embodiment, the proxy service 336 can authenticate the subscriber and determine how to respond to request 420 using subscriber information associated with the subscriber identifier. Proxy service 336 accesses database 350 using the subscriber identifier in response to request 420. Proxy service 336 can determine any user records 354 and/or network records 352 that match the subscriber identifier. Proxy service 336 uses the subscriber information to determine how to respond to the request for the target domain name 338. For example, proxy service 336 may determine what flags, etc. are associated with the target domain name and correlate those flags with any preferences or policies in the subscriber information. Proxy service 336 may use this information to determine if the subscriber associated with the subscriber ID is permitted access to the requested domain from the particular subscriber network 310.

If the proxy service determines that the subscriber is permitted access to the target domain name, it can proxy the client resource request. The proxy service issues a resource request 422 for the target domain name as received from the client 312. The proxy service may pass any cookies set by the target domain or the client 312 as may be received in request 420. The proxy service 336 receives a response 424 from the proxy service 336 in reply to request 422. Proxy service 336 issues a resource response 426 to request 420, passing the response 424 received from the target domain.

If the proxy service determines that the subscriber is not permitted access to the target domain name, a block or landing page can be provided to the client device. For example, response 426 may be issued with a redirect to a block or landing page. In this case, request 422 is not issued.

In one option, the proxy service 336 may authenticate the subscriber in response to request 416. Proxy service 336 may extract the tracking identifier from the unique domain name. It may then access the tracking identifier to subscriber identifier mapping provided by DNS nameserver 336 in message 412 to determine the subscriber identifier. The proxy service 336 may then access any user record and/or network records to determine how to respond to requests associated with the subscriber. Moreover, it is noted that while the example of FIG. 4 describes applying subscriber information to generate a response to the client's resource request, this is not required. For example, the proxy service may simply determine the subscriber identifier and begin proxying requests from the client 312 for the target domain name without accessing or analyzing subscriber information such as preferences and policies.

Arrow 428 represents the scenario where the client 312 includes an authentication cookie for the target domain name. If the client 312 includes an authentication cookie, the prosy service proceeds as shown to authenticate the subscriber and proxy the request, etc.

Figure 5:
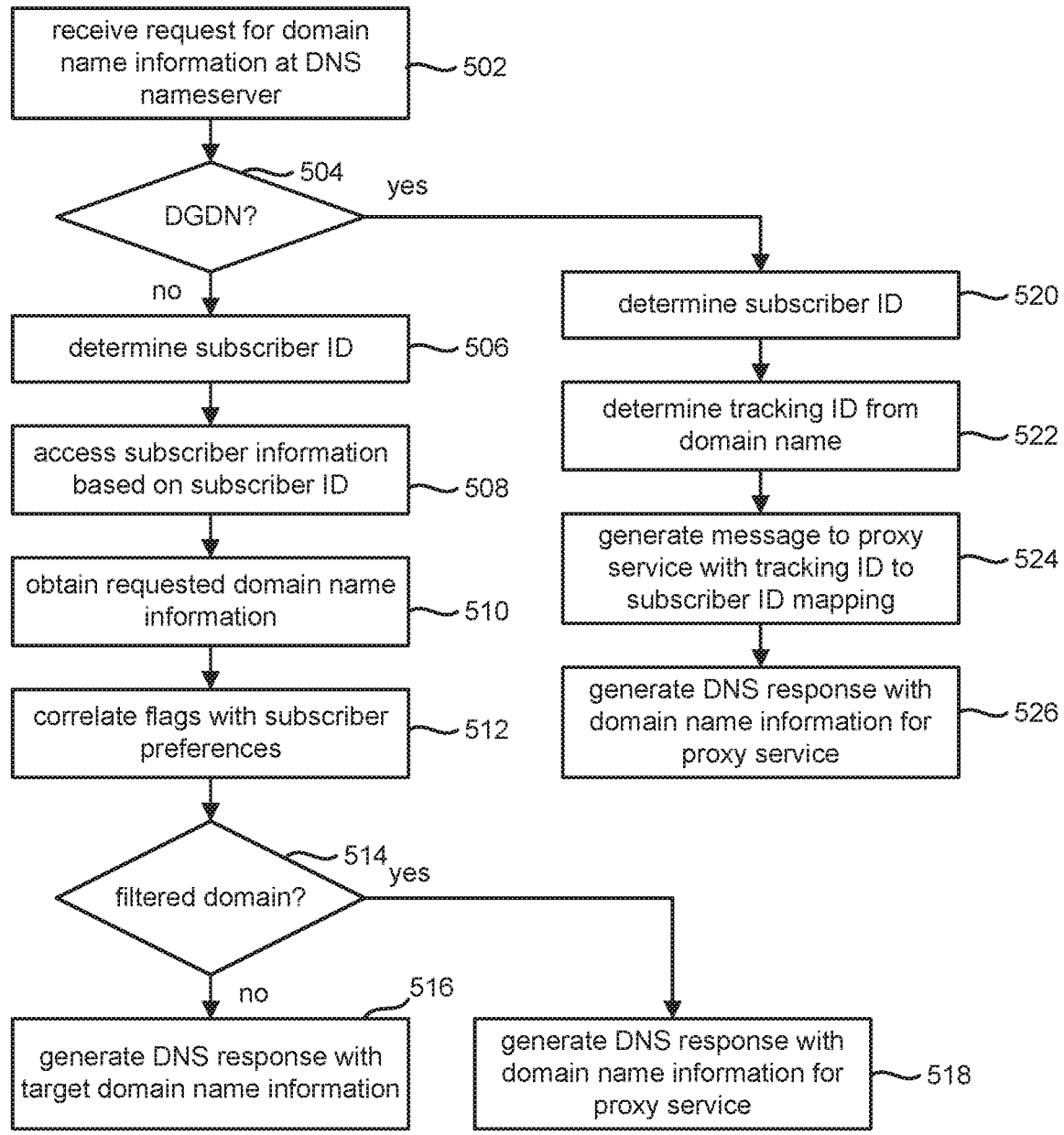
FIG. 5 is a flowchart describing a method of processing a DNS requests in accordance with one embodiment.

FIG. 5 is a flowchart describing a method of processing domain name requests by a recursive DNS nameserver in accordance with one embodiment. At step 502, the DNS nameserver 332 receives a request (e.g., 402) for domain name information from a client device 312. At step 504, the nameserver determines whether the requested domain name is a dynamically generated domain name (DGDN) from the proxy service. The nameserver can determine whether the domain name meets a predetermined format for domain names that will trigger a subscriber identification and authentication process. For example, the nameserver can determine whether the domain name includes a predetermine fixed domain name portion in an implementation using a fixed domain name for the identification and authentication redirect process. In another example, the nameserver can determine whether the domain name includes a format such as a tracking identifier, followed by a proxy IP address, followed by a target domain name. Other techniques may be used for detecting a predetermined format as part of a redirect process.

If the requested domain name is not a dynamically generated domain name from the proxy service, the proxy service determines a subscriber identifier associated with the DNS request at step 506. In one example, the DNS nameserver parses the DNS request for the source IP address which is used as the subscriber identifier. In another example, a token or the subscriber ID itself may be passed with the DNS request such as by using an EDNS extension. At step 508, the DNS nameserver uses the subscriber identifier to obtain subscriber information (e.g, network record 352 and/or user record 354) corresponding to the subscriber identifier from database 350. At step 510, the DNS nameserver obtains the requested domain name information. Step 510 may include determining the domain name in the request and checking cache 340 for a domain name record corresponding to the target domain name. If the cache contains a domain name record for the target domain name and the record is not expired, the DNS nameserver obtains the cached domain name record. If the cache does not contain a domain name record for the target domain or if the domain name record is expired, the DNS nameserver attempts to retrieve the domain name information using one or more authoritative and/or root DNS nameservers.

After obtaining the domain name information, the DNS nameserver determines whether there are any flags associated with the requested domain and if so, correlates the flags with the preferences in the network record 352 at step 512. Step 512 includes determining whether the domain name information for the requested domain includes any identifiers corresponding to preferences in the network record. For example, step 512 may include determining an age-rating for the domain and comparing that with an age-rating preference in the network record.

If any of the flags correlate to preferences in the network record, the DNS nameserver determines if any of the flags and corresponding network preferences indicate that the traffic to the domain should be filtered at step 514. In one embodiment, step 514 includes determining whether the network records indicate that the requested domain should be blocked for requests from the subscriber's network. Step 514 may also include determining whether the records indicate that traffic for the requested domain should be proxied, but access still allowed.

If the domain name information contains a flag indicating that the requested domain should be proxied or blocked, the DNS nameserver issues a DNS response at step 518 with domain name information for the proxy service 336 at web server 334. If the domain is not to be blocked or proxied, the DNS nameserver issues a DNS response at step 516 with domain name information for the requested domain.

Returning to step 504, if DNS nameserver 332 determines that the requested domain name is a dynamically generated domain name from the proxy service, it determines a subscriber identifier associated with the DNS request at step 520. In one embodiment, steps 520 and 506 can be performed as a single step before step 504.

At step 522, nameserver 332 determines the tracking identifier from the domain name. After determining the tracking identifier, the nameserver generates a message to the proxy service at step 524. The message includes a mapping of the transaction identifier from the domain name to the subscriber identifier determined at step 520. At step 526, the nameserver generates a DNS response to the client device 512, passing domain name information that maps to the proxy service.

Figure 6:
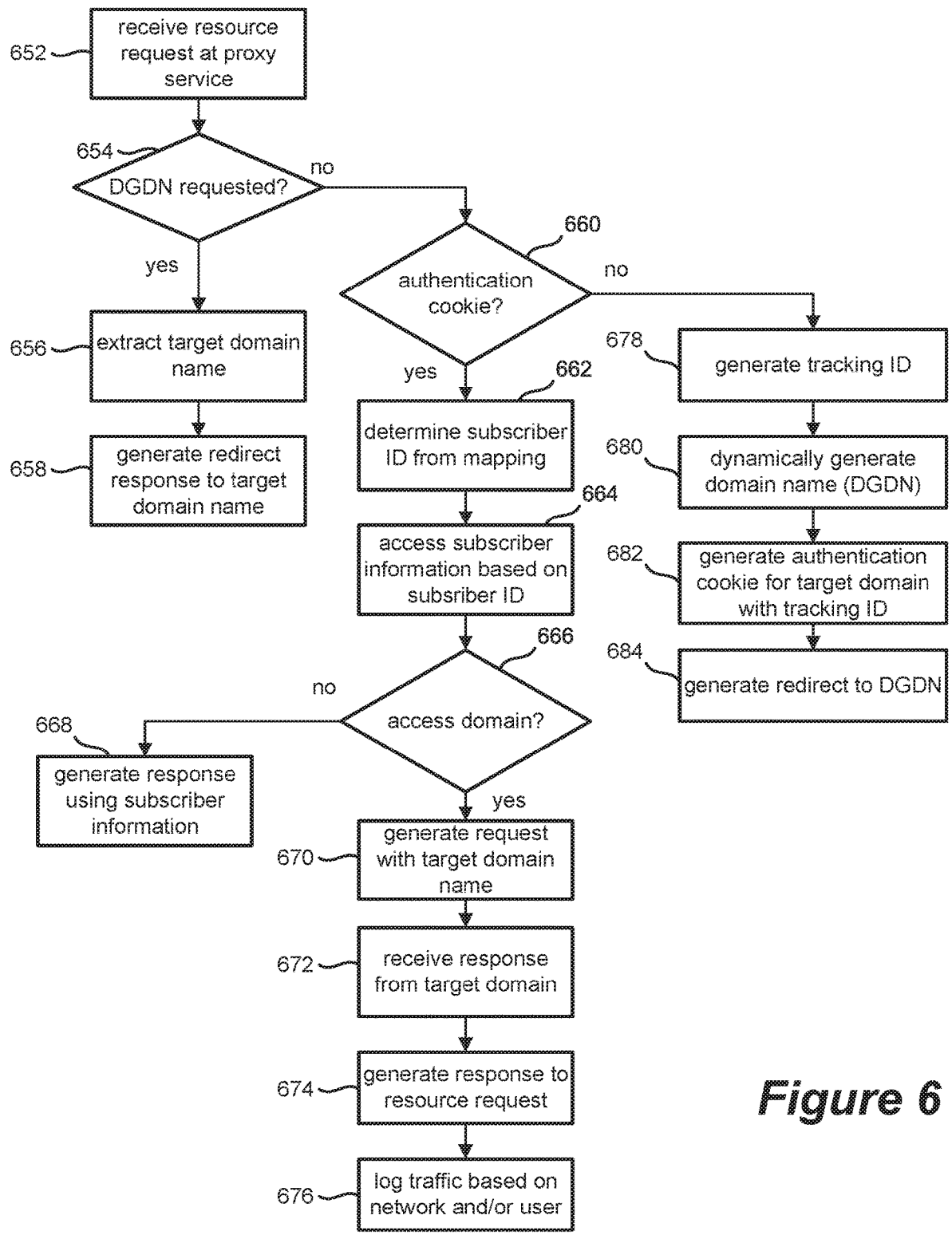
FIG. 6 is a flowchart describing a method of processing resource requests in accordance with one embodiment.

FIG. 6 is a flowchart describing processing by a proxy service 336 in accordance with an embodiment. At step 652, the proxy service receives a resource request. Step 652 is often an HTTP request specifying a domain name and a network resource hosted at the target domain name using a URI, but any suitable protocol for requesting network resources may be used. The proxy service examines the requested domain name to determine if it is a dynamically generated domain name by the proxy service at step 654. The proxy service may analyze the format of the domain name in the same manner as the nameserver earlier described.

If a dynamically generated domain name from the proxy service is not the requested domain name, the proxy service determines whether the request includes an authentication cookie for the target domain at step 660. Step 660 includes checking for an authentication cookie set by the proxy service. If the request does not include an authentication cookie for the target domain, the proxy service generates a tracking identifier at step 678. At step 680, the proxy service dynamically generates a unique domain name for the request.

Step 680 may include appending the tracking identifier to the target domain name from the request in one embodiment. For example, the tracking identifier may be appended to the beginning of the URI from the request in one example. In this manner, the tracking identifier is added as a subdomain of the target domain name.

In another example, step 680 may include using a predetermined fixed domain name. The tracking identifier can be appended to the fixed domain name as a subdomain in one example as with the earlier example. To track the target domain name, the target domain name is appended as an argument to the fixed domain name in one example.

Although not shown, the IP address of the web server hosting the proxy service can be added as part of forming the unique domain name in one embodiment. For example. the IP address can be added as a subdomain of the fixed domain name or target domain name in various embodiments.

The proxy service generates an authentication cookie for the target domain name at step 682. The authentication cookie includes the tracking identifier generated at step 678 and is set for the target domain. In this manner, the client device will pass the authentication cookie with subsequent requests for the target domain name. Because the nameserver maps requests for the target domain name to the proxy service, the authentication cookie with the tracking identifier will be passed to the proxy service during subsequent requests.

At step 684, the proxy service generates a redirect response for the client 312. The redirect response (e.g., 302 redirect) includes a redirect URI specifying the unique domain name. The proxy service sends the redirect response to the client 312 which sets the authentication cookie at the client for the target domain. Recall that the unique domain name includes the tracking identifier and in some manner, the original target domain name. Accordingly, the proxy service generates a redirect response that causes the client 312 to issue a DNS request to the nameserver that will include the tracking identifier. Because the client 312 passes the subscriber identifier with DNS request, the nameserver is able to correlate or map the tracking identifier to the subscriber identifier as earlier described.

Returning to step 660, if the request includes an authentication cookie for the target domain, the proxy service attempts to determine a subscriber identifier for the request at step 662. The proxy service accesses the tracking identifier from the authentication cookie. Using the tracking identifier, the proxy service determines whether it has received a message from the DNS nameserver with a mapping of the tracking identifier to a subscriber identifier. In one example, the proxy service may store a list of tracking identifier to subscriber identifier mappings that is has received. If the proxy service does not find a subscriber identifier, it can return from 662 to step 678 in one example to attempt the redirection again to cause a mapping to be sent by the nameserver.

At step 664, the proxy service optionally accesses subscriber information such as user records and/or network records corresponding to the subscriber identifier. At step 666, the proxy service uses the subscriber information, if obtained, to determine how to respond to the resource request. As with the DNS nameserver, the proxy service may determine if the domain name record for the target domain contains any flags. The proxy service may correlate the subscriber preferences with the policies with any flags to determine whether the requested resource should be retrieved for the client device form the target domain.

If the proxy service determines that the subscriber or user associated with the subscriber should not access the target domain name, the proxy service generates a response to the request at step 668. The proxy service can provide a block or landing page to the client device, for example, informing the subscriber that the requested domain is not accessible to them. The block or landing page refers generally to any resource or information provided by the proxy service in response to a request for a target domain that is not an actual resource provided by the target domain. The response may include a redirect URI to a block or landing page in one example.

If the proxy service determines that the subscriber or user can access the target domain, the proxy service issues a request at step 670 for the target domain name. The request at step 670 may be a resource request indicated by the URI of the request received at step 652. The proxy service proxies the resource request by issuing its own request to the requested domain. At step 672, the proxy service receives a response from the target domain with a resource indicated by the request URI. At step 674, the proxy service generates a response to the resource request including the resource from the target domain. The proxy service may optionally log the traffic for auditing, etc. at step 676. Step 676 can include logging and associating the traffic with a particular user of client device 312 or only with a subscriber network 310.

Returning to step 654, the proxy service proceeds at steps 656 when a dynamically generated domain name is requested. The proxy service extracts the target domain name from the request including the dynamically generated domain name. At step 658, the proxy service generates a redirect response including the extracted target domain name. For example, the proxy service may generate an HTTP 302 redirect URI that includes the extracted target domain name. As earlier described, the redirect at step 658 will eventually result in a request being received at the proxy service which is for the target domain name and that includes an authentication cookie for the target domain name containing a tracking identifier.

In one example, the proxy service may extract the tracking identifier from the dynamically generated domain name in connection with steps 656 and 658. The proxy service can determine the corresponding subscriber identifier and optionally subscriber information for the subscriber identifier. In this manner, the proxy service may directly proxy the request for the target domain name without redirect or can determine whether the subscriber should be permitted access in order to determine whether to redirect them to the target domain name.

Figure 7:
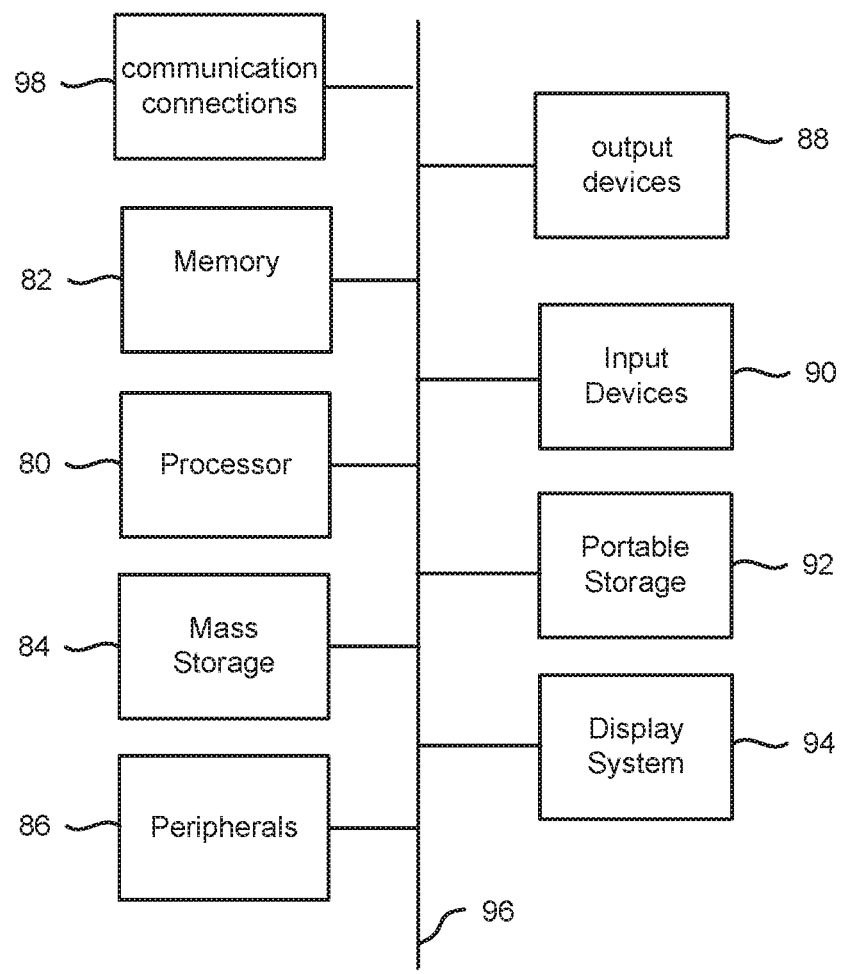
FIG. 7 is a simplified block diagram of a computing device that can be used to implement various embodiments of the disclosed technology.

FIG. 7 is a high level block diagram of a computing system which can be used to implement any of the computing devices of FIG. 3. The computing system of FIG. 7 includes processor 80, memory 82, mass storage device 84, peripherals 86, output devices 88, input devices 90, portable storage 92, and display system 94. For purposes of simplicity, the components shown in FIG. 7 are depicted as being connected via a single bus 96. However, the components may be connected through one or more data transport means. In one alternative, processor 80 and memory 82 may be connected via a local microprocessor bus, and the mass storage device 84, peripheral device 86, portable storage 92 and display system 94 may be connected via one or more input/output buses.

Processor 80 may contain a single microprocessor, or may contain a plurality of microprocessors for configuring the computer system as a multiprocessor system. Memory 82 stores instructions and data for programming processor 80 to implement the technology described herein. In one embodiment, memory 82 may include banks of dynamic random access memory, high speed cache memory, flash memory, other nonvolatile memory, and/or other storage elements. Mass storage device 84, which may be implemented with a magnetic disc drive or optical disc drive, is a nonvolatile storage device for storing data and code. In one embodiment, mass storage device 84 stores the system software that programs processor 80 to implement the technology described herein. Portable storage device 92 operates in conjunction with a portable nonvolatile storage medium, such as a floppy disc, CD-RW, flash memory card/drive, etc., to input and output data and code to and from the computing system of FIG. 7. In one embodiment, system software for implementing embodiments is stored on such a portable medium, and is input to the computer system via portable storage medium drive 92.

Peripheral devices 86 may include any type of computer support device, such as an input/output interface, to add additional functionality to the computer system. For example, peripheral devices 86 may include one or more network interfaces for connecting the computer system to one or more networks, a modem, a router, a wireless communication device, etc. Input devices 90 provide a portion of a user interface, and may include a keyboard or pointing device (e.g. mouse, track ball, etc.). In order to display textual and graphical information, the computing system of FIG. 7 will (optionally) have an output display system 94, which may include a video card and monitor. Output devices 88 can include speakers, printers, network interfaces, etc. Device 100 may also contain communications connection(s) 112 that allow the device to communicate with other devices via a wired or wireless network. Examples of communications connections include network cards for LAN connections, wireless networking cards, modems, etc. The communication connection(s) can include hardware and/or software that enables communication using such protocols as DNS, TCP/IP, UDP/IP, and HTTP/HTTPS, among others.

The components depicted in the computing system of FIG. 7 are those typically found in computing systems suitable for use with the technology described herein, and are intended to represent a broad category of such computer components that are well known in the art. Many different bus configurations, network platforms, operating systems can be used. The technology described herein is not limited to any particular computing system.

The technology described herein, including the proxy service, can be implemented using hardware, software, or a combination of both hardware and software. The software used is stored on one or more of the processor readable storage devices described above (e.g., memory 82, mass storage 84 or portable storage 92) to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware including custom integrated circuits, gate arrays, FPGAs, PLDs, and special purpose computers. In one embodiment, software (stored on a storage device) implementing one or more embodiments is used to program one or more processors. The one or more processors can be in communication with one or more computer readable media/storage devices, peripherals and/or communication interfaces. In alternative embodiments, some or all of the software can be replaced by dedicated hardware including custom integrated circuits, gate arrays, FPGAs, PLDs, and special purpose computers.

Figure 8:
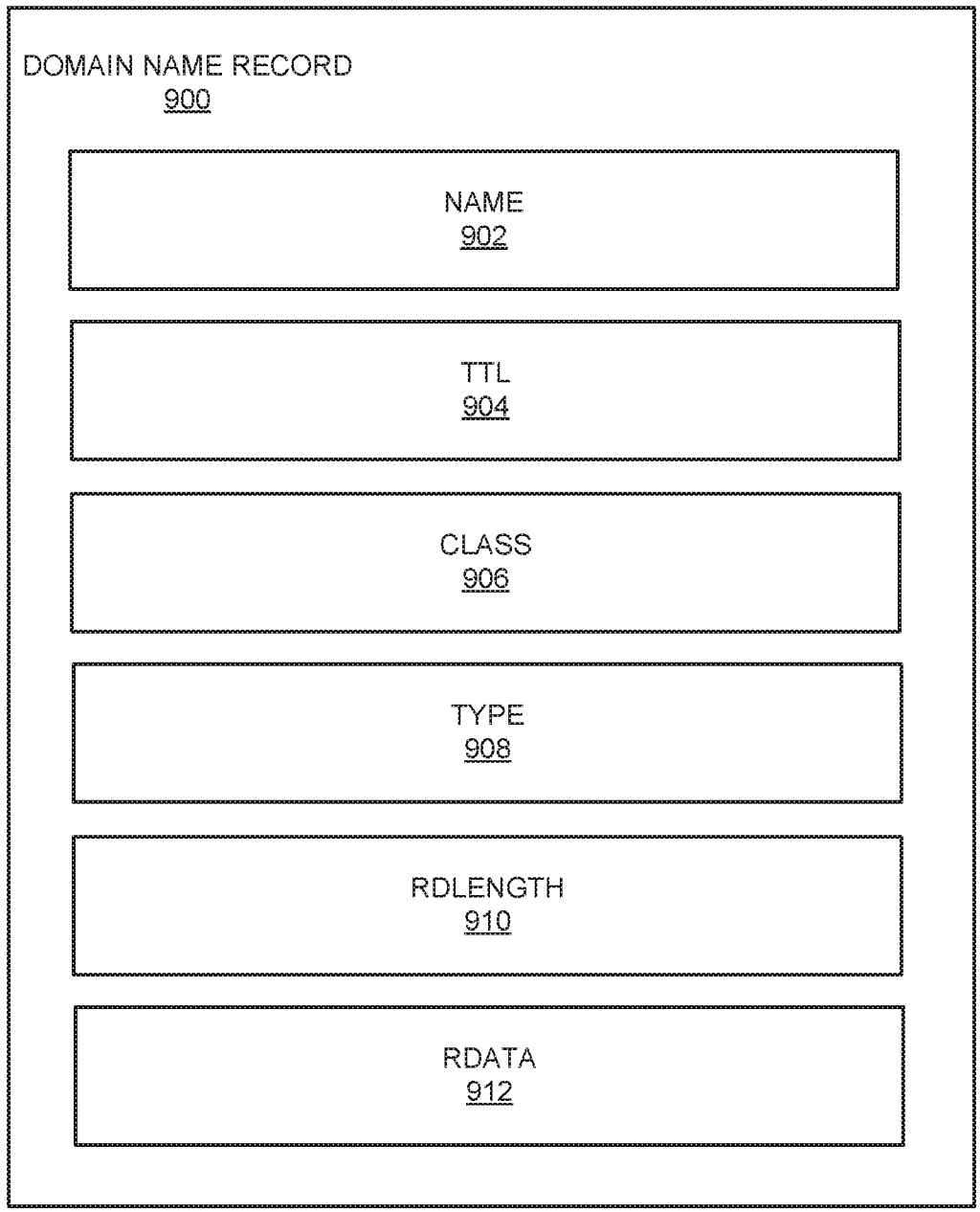
FIG. 8 depicts the structure of an example of a DNS resource record.

FIG. 8 is a block diagram depicting the structure of a domain name resource record that can be stored in the local cache at the recursive DNS clusters. Each resource record includes a name field 902, a TTL field 904, a class field 906, a type field 908, an RDLENGTH field 910 and an RDATA field 912. As earlier described, the TTL field sets the maximum amount of time for maintaining the resource record before it should be treated as invalid and expired. In accordance with one embodiment, the RDATA field is used for various flags that may be set by the recursive nameservers to indicate some additional information about the domain in addition to the standard DNS specified information. A flag can be any indicator, marking or symbol associated with a domain name, such as a binary indicator in part of the RDATA field. The flags may have various functions, including but not limited to marking domain names as suspicious or untrustworthy, such as a web site associated with phishing activities. Flags may be used to indicate various types and levels of information. For information, social networking or pornographic web pages may be flagged so that the nameserver can provide alternate or additional information when a client issues a request.

Figure 9:
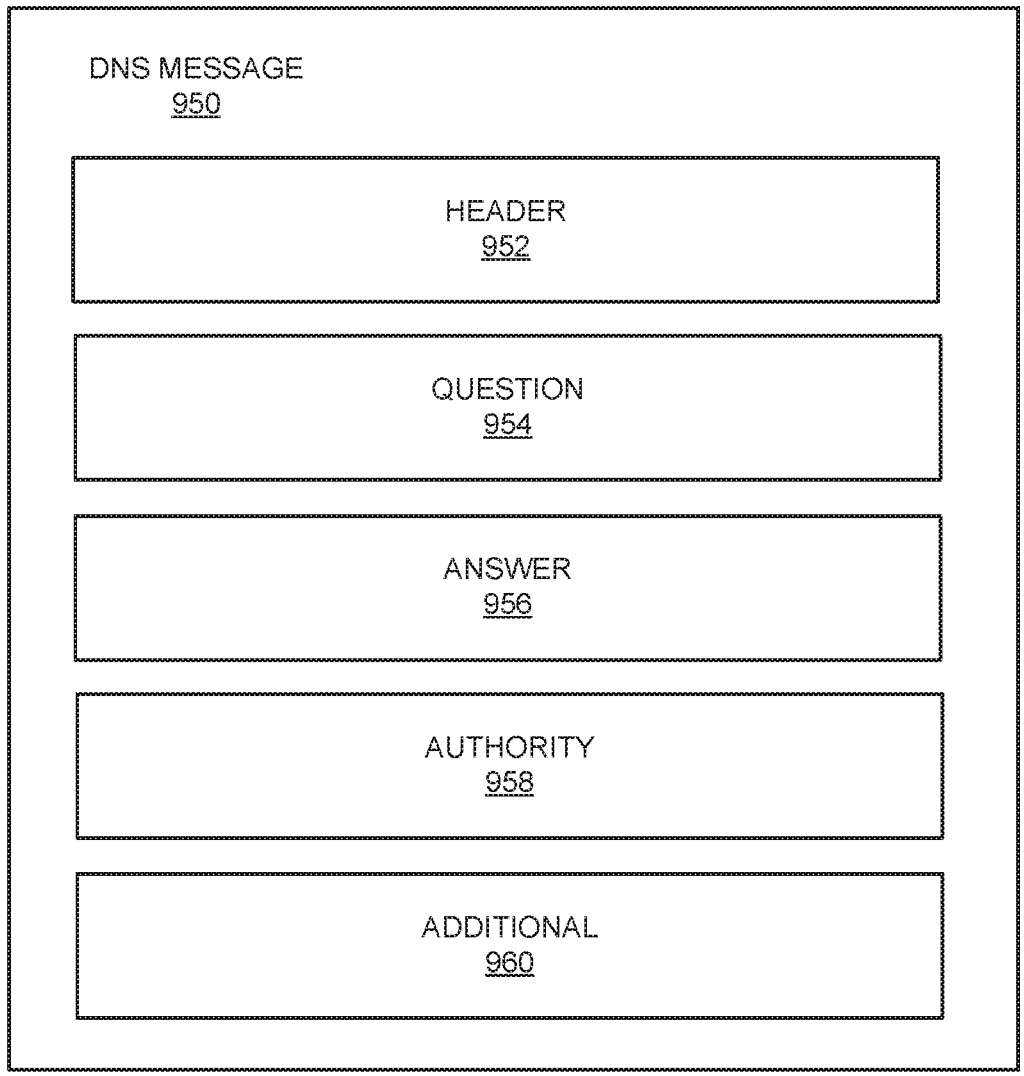
FIG. 9 depicts the structure of an example of a DNS message.

FIG. 9 is a block diagram depicting the structure of a DNS message response or request 950. A DNS message includes a header field 952, a question section 954, an answer section 956, an authority section 958 and an additional section 960. The question section indicates the question for (or request) of the name server in a DNS request. The question field in a DNS response includes one or more resource records answering a question from a DNS request. The authority section includes one or more resource records pointing to an authority. The additional section is structured like a resource record and can include various types of information, such as the subscriber identifier as described above. In one example, the additional section includes an OPT RR containing zero or more key/value pair that might describe subscriber id information such as device id, etc.

A method of computer network processing has been described that includes receiving at a proxy service a first request associated with a target domain name and in response to the first request, generating a first identifier and a first domain name including the first identifier. The method includes providing a redirect response from the proxy service including the first domain name in response to the first request, receiving at the proxy service from a DNS nameserver a message including a subscriber identifier for the first identifier, receiving at the proxy service a second request associated with the target domain name where the second request includes the first identifier. The method includes determining in response to the second request the subscriber identifier corresponding to the first identifier based on the message from the DNS nameserver and generating a response to the second request based on the subscriber identifier.

A method of computer network processing has been described that includes receiving at a proxy service a message from a DNS nameserver mapping a first tracking identifier to a first subscriber identifier, receiving at the proxy service a first request having a resource identifier including a first domain name and a target domain name, and providing a redirect response for the first request where the redirect response including a resource identifier associated with the target domain name. The method includes receiving at the proxy service a second request having a resource identifier associated with the appended target domain name where the second request including a cookie for the target domain name with the first request identifier. The method includes determining that the first subscriber identifier from the cookie maps to the first tracking identifier based on the message from the DNS nameserver, and generating a response to the second request based on the subscriber identifier.

A system has been described that includes at least one web server including at least one processor and at least one DNS nameserver including at least one processor. The at least one processor of the at least one web server is programmed to receive from a client a first request associated with a target domain name, generate a first identifier and a first domain name including the first identifier, provide a redirect response including the first domain name in response to the first request, receive from a DNS nameserver a subscriber identifier corresponding to the first identifier, receive a second request associated with the target domain name, the second request including the first identifier, determine in response to the second request the subscriber identifier corresponding to the first identifier based on the message from the DNS nameserver, and generate a response to the second request based on the subscriber identifier. The at least one processor of the at least one DNS nameserver is programmed to receive a DNS request for domain name information for the first domain name as a result of the redirect response from the at least one web server that includes the subscriber identifier, determine the first identifier from the first domain name, generate a message to the at least one web server including a mapping of the first identifier to the subscriber identifier, and generate a DNS response to the request for domain name information with domain name information for the at least one web server.

The foregoing detailed description has been presented for purposes of illustration and description. It is not intended to be exhaustive or to limit the invention to the precise form disclosed. Many modifications and variations are possible in light of the above teachings. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of computer network processing, comprising:
    obtaining at a proxy service from a Domain Name System (DNS) nameserver a message that includes mapping information that maps a tracking identifier to a subscriber identifier;
    obtaining at the proxy service a first request having a resource identifier including a unique domain name, wherein the unique domain name includes a target domain name;
    providing a redirect response for the first request, the redirect response including a resource identifier associated with the target domain name;
    obtaining at the proxy service a second request having a resource identifier associated with the target domain name, the second request including a cookie for the target domain name, wherein the cookie of the second request is associated with the subscriber identifier and includes the tracking identifier;
    in response to the second request, authenticating the subscriber identifier by determining that the subscriber identifier from the cookie maps to the tracking identifier based on the message from the DNS nameserver; and
    generating a response to the second request based on the subscriber identifier permitting or denying access to the target domain name.

2. The method of claim 1, wherein the tracking identifier is embedded as part of the unique domain name, the method further comprising:
    extracting the tracking identifier from the unique domain name; and
    determining that the tracking identifier maps to the subscriber identifier.

3. The method of claim 2, further comprising:
    authenticating the first request based on the subscriber identifier; and
    providing the redirect response in response to authenticating the first request.

4. The method of claim 1, further comprising at the proxy service, prior to obtaining the message from the DNS nameserver and obtaining the first request:
    obtaining a third request having a resource identifier associated with the target domain name; and
    determining that the third request does not include a cookie for the target domain name, wherein the cookie of the third request is associated with the subscriber identifier.

5. The method of claim 4, further comprising:
    in response to the third request, generating the tracking identifier and the unique domain name to include the tracking identifier; and
    providing a redirect response to the third request including the resource identifier.

6. The method of claim 5, further comprising at the DNS nameserver:
    obtaining a request for domain information for the unique domain name, the request including the subscriber identifier; and
    in response to the request for domain name information for the unique domain name, generating the message to the proxy service including the mapping information that maps the tracking identifier to the subscriber identifier.

7. The method of claim 6, further comprising:
    in response to the request for domain information for the unique domain name, generating a reply including domain name information for the proxy service.

8. A system for computer network processing, comprising:
    a DNS name server; and
    a proxy service, wherein the proxy service is configured to:
        obtain from a Domain Name Server (DNS) nameserver a message that includes mapping information that maps a tracking identifier to a subscriber identifier;
        obtain a first request having a resource identifier including a unique domain name, wherein the unique domain name includes a target domain name;
        provide a redirect response for the first request, the redirect response including a resource identifier associated with the target domain name;
        obtain a second request having a resource identifier associated with the target domain name, the second request including a cookie for the target domain name, wherein the cookie of the second request is associated with the subscriber identifier and includes the tracking identifier;
        in response to the second request, authenticate the subscriber identifier by determining that the subscriber identifier from the cookie maps to the tracking identifier based on the message from the DNS nameserver; and generate a response to the second request based on the subscriber identifier permitting or denying access to the target domain name.

9. The system of claim 8, wherein the tracking identifier is embedded as part of the unique domain name, and wherein the proxy service is further configured to:
    extract the tracking identifier from the unique domain name; and
    determine that the tracking identifier maps to the subscriber identifier.

10. The system of claim 9, wherein the proxy service is further configured to:
    authenticate the first request based on the subscriber identifier; and
    provide the redirect response in response to authenticating the first request.

11. The system of claim 8, wherein the proxy service is further configured to, prior to obtaining the message from the DNS nameserver and obtaining the first request:
    obtain a third request having a resource identifier associated with the target domain name; and
    determine that the third request does not include a cookie for the target domain name, wherein the cookie of the third request is associated with the subscriber identifier.

12. The system of claim 11, wherein the proxy service is further configured to:
    in response to the third request, generate the tracking identifier and the unique domain name to include the tracking identifier; and
    provide a redirect response to the third request including the resource identifier.

13. The system of claim 12, wherein the DNS nameserver is configured to:
    obtain a request for domain information for the unique domain name, the request including the subscriber identifier; and
    in response to the request for domain name information for the unique domain name, generate the message to the proxy service including the mapping information that maps the tracking identifier to the subscriber identifier.

14. The system of claim 13, wherein the DNS nameserver is further configured to:
    in response to the request for domain information for the unique domain name, generate a reply including domain name information for the proxy service.

15. One or more non-transitory computer readable storage media encoded with instructions that, when executed by one or more processors, cause the one or more processors to:
    obtain at a proxy service from a Domain Name System (DNS) nameserver a message that includes mapping information that maps a tracking identifier to a subscriber identifier;
    obtain at the proxy service a first request having a resource identifier including a unique domain name, wherein the unique domain name includes a target domain name;
    provide a redirect response for the first request, the redirect response including a resource identifier associated with the target domain name;
    obtain at the proxy service a second request having a resource identifier associated with the target domain name, the second request including a cookie for the target domain name, wherein the cookie of the second request is associated with the subscriber identifier and includes the tracking identifier;
    in response to the second request, authenticate the subscriber identifier by determining that the subscriber identifier from the cookie maps to the tracking identifier based on the message from the DNS nameserver; and
    generate a response to the second request based on the subscriber identifier permitting or denying access to the target domain name.

16. The one or more non-transitory computer readable storage media of claim 15, wherein the tracking identifier is embedded as part of the unique domain name, and wherein the instructions further cause the one or more processors to:
    extract the tracking identifier from the unique domain name; and
    determine that the tracking identifier maps to the subscriber identifier.

17. The one or more non-transitory computer readable storage media of claim 16, wherein the instructions further cause the one or more processors to:
    authenticate the first request based on the subscriber identifier; and
    provide the redirect response in response to authenticating the first request.

18. The one or more non-transitory computer readable storage media of claim 15, wherein the instructions further cause the one or more processors to, prior to obtaining the message from the DNS nameserver and obtaining the first request:
    obtain a third request having a resource identifier associated with the target domain name; and
    determine that the third request does not include a cookie for the target domain name, wherein the cookie of the third request is associated with the subscriber identifier.

19. The one or more non-transitory computer readable storage media of claim 18, wherein the instructions further cause the one or more processors to:
    in response to the third request, generate the tracking identifier and the unique domain name to include the tracking identifier; and
    provide a redirect response to the third request including the resource identifier.

20. The one or more non-transitory computer readable storage media of claim 19, wherein the instructions further cause the one or more processors to:
    obtain a request for domain information for the unique domain name, the request including the subscriber identifier;
    in response to the request for domain name information for the unique domain name, generate the message to the proxy service including the mapping information that maps the tracking identifier to the subscriber identifier; and
    in response to the request for domain information for the unique domain name, generate a reply including domain name information for the proxy service.

* * * * *